(12) United States Patent
Yang et al.

(10) Patent No.: US 7,240,065 B2
(45) Date of Patent: Jul. 3, 2007

(54) PROVIDING MAPPINGS BETWEEN LOGICAL TIME VALUES AND REAL TIME VALUES

(75) Inventors: Wanli Yang, San Mateo, CA (US); Bipul Sinha, Foster City, CA (US); Amit Ganesh, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 463 days.

(21) Appl. No.: 10/856,569

(22) Filed: May 27, 2004

(65) Prior Publication Data

US 2005/0278350 A1    Dec. 15, 2005

(51) Int. Cl.
*G06F 17/00* (2006.01)
*G06F 7/00* (2006.01)

(52) U.S. Cl. .................... 707/100; 707/201
(58) Field of Classification Search .......... 707/3–5, 707/100–102, 201–205; 711/102–104, 147, 711/156, 5, 161, 200, 202, 209; 709/203
See application file for complete search history.

(56) References Cited

U.S. PATENT DOCUMENTS

| | | | |
|---|---|---|---|
| 5,280,612 A | 1/1994 | Lorie et al. | |
| 5,317,731 A | 5/1994 | Dias et al. | |
| 5,347,653 A | 9/1994 | Flynn et al. | |
| 5,440,730 A | 8/1995 | Elmasri et al. | |
| 5,546,558 A * | 8/1996 | Jacobson et al. | 711/114 |
| 5,638,508 A | 6/1997 | Kanai et al. | |
| 5,680,570 A * | 10/1997 | Rantala et al. | 711/113 |
| 5,701,480 A | 12/1997 | Raz | |
| 5,724,581 A * | 3/1998 | Kozakura | 707/202 |
| 5,787,445 A * | 7/1998 | Daberko | 707/205 |

(Continued)

FOREIGN PATENT DOCUMENTS

FR    2 746 526 A1    9/1997

OTHER PUBLICATIONS

Chandrasekaran, Sirish, "PSoup: a system for streaming queries over streaming data" (2003) vol. 12, Issue 2, pp. 140-156.

(Continued)

*Primary Examiner*—Hosain Alam
*Assistant Examiner*—Jacques Veillard
(74) *Attorney, Agent, or Firm*—Hickman Palermo Troung & Becker (57) ABSTRACT

Techniques are provided for providing mappings between logical time values and real time values for a database. The techniques include, if a first event related to the database occurs, writing an entry of a current LTV and a current RTV in a volatile mapping data structure; and if a second event related to the database occurs, writing one or more entries in a non-volatile mapping data structure based on information contained in the volatile mapping data structure. The techniques also include, once a request from a requestor to provide an LTV that is mapped to a particular RTV is received, determining the LTV for the particular RTV, based on the particular RTV and information from a source, wherein the source is one of the volatile mapping data structure and the non-volatile mapping data structure; and providing the LTV that is mapped to the particular RTV to the requestor.

42 Claims, 6 Drawing Sheets

U.S. PATENT DOCUMENTS

| | | | |
|---|---|---|---|
| 5,845,313 A * | 12/1998 | Estakhri et al. | 711/103 |
| 5,857,204 A | 1/1999 | Lordi et al. | |
| 5,873,102 A | 2/1999 | Bridge, Jr. et al. | |
| 5,890,167 A | 3/1999 | Bridge, Jr. et al. | |
| 5,907,848 A | 5/1999 | Zaiken et al. | |
| 5,930,794 A | 7/1999 | Linenbach et al. | |
| 5,940,850 A * | 8/1999 | Harish et al. | 711/102 |
| 5,956,731 A | 9/1999 | Bamford et al. | |
| 5,974,427 A | 10/1999 | Reiter | |
| 6,012,059 A | 1/2000 | Neimat et al. | |
| 6,012,060 A | 1/2000 | Loaiza et al. | |
| 6,014,674 A | 1/2000 | McCargar | |
| 6,018,746 A | 1/2000 | Hill et al. | |
| 6,029,160 A | 2/2000 | Cabrera et al. | |
| 6,067,550 A | 5/2000 | Lomet | |
| 6,138,121 A | 10/2000 | Costa et al. | |
| 6,148,377 A * | 11/2000 | Carter et al. | 711/147 |
| 6,173,292 B1 | 1/2001 | Barber et al. | |
| 6,182,241 B1 | 1/2001 | Ngai et al. | |
| 6,192,377 B1 | 2/2001 | Ganesh et al. | |
| 6,192,378 B1 | 2/2001 | Abrams et al. | |
| 6,237,001 B1 | 5/2001 | Bamford et al. | |
| 6,243,702 B1 | 6/2001 | Bamford et al. | |
| 6,263,338 B1 | 7/2001 | Ronström et al. | |
| 6,321,234 B1 | 11/2001 | Debrunner et al. | |
| 6,449,624 B1 | 9/2002 | Hammack et al. | |
| 6,480,847 B1 | 11/2002 | Linenbach et al. | |
| 6,502,133 B1 | 12/2002 | Baulier et al. | |
| 6,505,228 B1 | 1/2003 | Schoening et al. | |
| 6,567,928 B1 | 5/2003 | Lyle et al. | |
| 6,609,123 B1 | 8/2003 | Cazemier et al. | |
| 6,618,822 B1 | 9/2003 | Loaiza et al. | |
| 6,631,374 B1 | 10/2003 | Klein et al. | |
| 6,636,851 B1 | 10/2003 | Bamford et al. | |
| 6,647,473 B1 | 11/2003 | Golds et al. | 711/161 |
| 6,647,510 B1 | 11/2003 | Ganesh et al. | |
| 6,681,230 B1 | 1/2004 | Blott et al. | |
| 6,735,605 B2 | 5/2004 | Bird et al. | |
| 6,738,975 B1 | 5/2004 | Yee et al. | |
| 6,769,074 B2 | 7/2004 | Vaitzblit | |
| 6,769,124 B1 | 7/2004 | Schoening et al. | |
| 2002/0116457 A1 | 8/2002 | Eshleman et al. | 709/203 |
| 2005/0055385 A1 | 3/2005 | Sinha et al. | 707/203 |
| 2005/0055603 A1 | 3/2005 | Soran et al. | 714/7 |

OTHER PUBLICATIONS

Djafri, Nassima et al., "Spatio-temporal evolution: querying patterns of change in databases" (2002) ACM Press, pp. 35-41.

Sandra Cheevers, Oracle Corporation, "Oracle9i Database Summary," An Oracle White Paper, May 2002, pp. 1-35.

Ron Weiss, Oracle Corporation, "Oracle 9i Availability and Manageability Technology," Feb. 13, 2001, pp. 1-39.

Ron Weiss, Oracle Corporation, "Oracle High Availability Architectural Overview," Feb. 12, 2001, pp. 1-37.

Oracle Corporation, "Oracle9i Flashback Query," Oracle9i Database, Daily Feature, Apr. 18, 2002, pp. 1-2.

Oracle Corporation, "Flashback Technology," 2004, pp. 1-5.

Chiang Lee et al, "Temporal Grid File: A File Structure for Interval Data," Data & Knowledge Engineering, vol. 26, No. 1, May 1998, XP-001004414, pp. 71-97.

Toshiyuki Amagasa et al, "Implementing Time-Interval Class for Managing Temporal Data," International Workshop on Database and Expert Systems Applications, Aug. 26, 2003, XP-002167975, 7 pages.

* cited by examiner

| First Mapping Table 200 ||
|---|---|
| Logical Time Value Column 210 | Real Time Value Column 220 |
|  |  |
|  |  |
|  |  |

FIG. 2B

| Second Mapping Table 240 | | | | | |
|---|---|---|---|---|---|
| Start Logical Time Value Column 242 | Start Real Time Value Column 244 | End Logical Time Value Column 246 | End Real Time Value Column 248 | Length Column 250 | Data Column 252 |
|  |  |  |  |  |  |
|  |  |  |  |  |  |

PROVIDING MAPPINGS BETWEEN LOGICAL TIME VALUES AND REAL TIME VALUES

RELATED APPLICATIONS

This application is related to U.S. patent application Ser. No. 10/325,211, entitled "METHOD AND APPARATUS FOR ACCESSING DATA AS IT EXISTED AT A PREVIOUS POINT IN TIME", filed Dec. 18, 2002, naming Sinha et al. as inventors, which is hereby incorporated by reference for all purposes as if fully set forth herein (referred to herein as '211).

This application is also related to U.S. patent application Ser. No. 10/866,234, entitled, "PROVIDING MAPPINGS BETWEEN LOGICAL TIME VALUES AND REAL TIME VALUES IN A MULTINODE SYSTEM", filed Jun. 10,2004, naming Yang et al. as inventors, which is hereby incorporated by reference for all purposes as if fully set forth herein.

FIELD OF THE INVENTION

The present invention relates to mapping between time and system events. The invention more specifically relates to providing mappings between logical time values (LTV) and real time values (RTV).

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

A query performed on a database allows the retrieval of specific information based on the data currently in the database. Some database systems provide data to a query based on a particular "snapshot" of the database, where the snapshot corresponds to a particular time value of the logical clock used by the database server. That is, one may be able to query a database and receive results "as of" a particular logical time, thereby receiving data that reflects only those changes that were committed as of the logical time.

In one approach, implemented as part of Oracle 9i, which was released in May of 2002, a subset of all of LTV to RTV mappings are written to disk. Given that, in a busy database system, there could be many new LTVs each second, a problem with the approach is that if all or most of the LTV to RTV mappings are written to disk, then the database system would be strained. On the other hand, if the number of mappings written to disk is reduced to a number that will not cause undue processing and I/O burden on the database system, then there will be significant gaps in both logical and real time in the stored LTV to RTV mappings. For example, if an LTV to RTV mapping for the database is recorded once every five minutes, then any "as of" query could have the real timing of the data used to perform the query incorrect by as much as five minutes.

Based on the foregoing, there is a clear need for techniques that provide mappings between logical time values and real time values in a manner that overcomes the needs described herein.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Techniques for providing mappings between logical time values and real time values are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

As will be discussed in more detail below, using the techniques described herein, a database server may provide a query result based on the state of the database as of a particular real time value. A user proxy unit receives the query for a result "as of" a particular real time and returns the query result based on the state of the database as of the particular real time. In order to do this, the user proxy unit may determine whether a logical time value corresponding to the real time value can be determined from a volatile mapping data structure, a non-volatile mapping data structure, or optionally, a mapping cache.

Any appropriate process or unit may keep the volatile mapping data structure and non-volatile mapping data structure up-to-date. A log writer unit and system monitoring unit are examples of processes that may keep the volatile mapping data structure and the non-volatile mapping data structure up-to-date, respectively. Each time the log writer unit transitions to a particular state, (e.g. is restarted by a "cron" job) the log writer will update the volatile mapping data structure with an LTV to RTV mapping from a logical time clock unit and a real time clock unit. This may happen, for example, every few seconds. Each time the system monitoring unit transitions to a particular state (e.g. is restarted by a "cron" job), the system monitoring unit will update the non-volatile mapping data structure based on the contents of the volatile mapping data structure. This may happen, for example, once every few minutes. The system monitoring unit may use information in the user configuration to determine what real time duration of RTVs to maintain in the non-volatile mapping data structure, thereby indicating the removal of RTVs that are "older" than a particular "age". The system monitoring unit may also use information in the user configuration to determine what duration of LTVs to maintain in the non-volatile mapping data structure. The volatile mapping data structure may be stored in a relatively faster machine-readable medium, and the non-volatile mapping data structure may be stored in a relatively slower machine-readable medium. Neither the relatively frequent writes to the volatile mapping data structure nor the relatively infrequent writes to the non-volatile mapping data structure significantly impact the performance of the database system.

In other embodiments, the techniques described herein are used to record mappings from LTVs to RTVs and the LTV may be determined based on an RTV, the volatile mapping data structure, and the non-volatile mapping data structure.

Structural Overview

Figure 1:
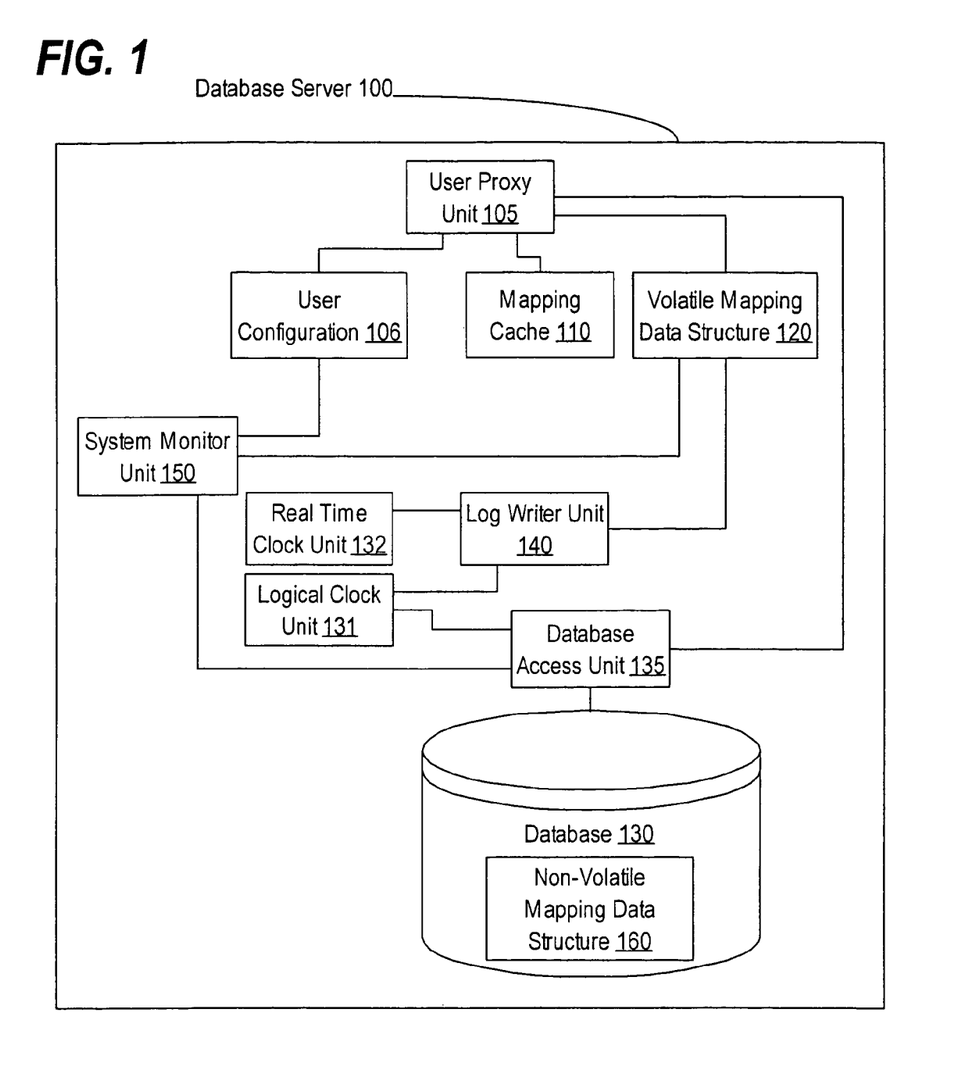
FIG. 1 is a block diagram depicting a system for providing mappings between logical time values and real time values.

FIG. 1 is a block diagram depicting a system for providing mappings between logical time values and real time values.

A database server 100 comprises a user proxy unit 105, a user configuration 106, a mapping cache 110, a volatile mapping data structure 120, a real time clock unit 132, a log writer unit 140, a system monitoring unit 150, a logical clock unit 131, a database access unit 135, a database 130, and a non-volatile mapping data structure 160. In various embodiments, the database server 100 is a single process running on a single physical machine or multiple processes running on one or more physical machines. Each of the user proxy unit 105, the real time clock unit 132, the database access unit 135, the log writer unit 140, the system monitoring unit 150, and the logical clock unit 131 is a logical machine. Each logical machine may be a process or set of processes running on a single physical machine or may be one or more processes running on a separate physical machine from the other physical machines. Each logical machine may also include one or more processes running on each of multiple physical machines. Various embodiments of computers and other physical and logical machines are described in detail below in the section entitled Hardware Overview.

There are numerous communicative couplings in the database server 100. The user proxy unit 105 is communicatively coupled to the user configuration 106, mapping cache 110, volatile mapping data structure 120, and the database access unit 135. The log writer unit 140 is communicatively coupled to the volatile mapping data structure 120, the real time clock unit 132, and the logical clock unit 131. The system monitoring unit 150 is communicatively coupled to the volatile mapping data structure 120, the user configuration 106, and the database access unit 135. The database access unit 135 is additionally communicatively coupled to the logical clock unit 131 and the database 130. In various embodiments, the coupling is accomplished by optical, infrared, or radio signal transmission, direct cabling, wireless networking, local area networks (LANs), wireless local area networks (WLANs), wide area network (WANs), the Internet, or any appropriate communication mechanism.

The user proxy unit 105 may comprise mechanisms for receiving or obtaining queries from database users or may comprise mechanisms for receiving requests for LTV to RTV mappings. The user proxy unit 105 may also include logic for determining if an LTV to RTV mapping can be determined from any of the mapping cache 110, volatile mapping data structure 120, or non-volatile mapping data structure 160.

The user configuration 106 may include one or more flat files, one or more database tables, or any appropriate storage mechanism stored on a machine-readable medium. Each of the mapping cache 110 and the volatile mapping data structure 120 may include a two-column table of LTVs and corresponding RTVs (similar to the table depicted in FIG. 2A) stored in memory or on another machine-readable medium. Alternatively, the mapping cache 110 or the volatile mapping data structure 120 may be any appropriate storage of LTV to RTV mappings, including data structure similar to those depicted in FIG. 2B. It may be beneficial to provide either or both of the mapping cache 110 and the volatile mapping data structure 120 on a relatively faster machine-readable medium than the non-volatile mapping data structure 160.

The real time clock unit 132 may include time keeping logic or a mechanism to send a request for a real-world time value and to receive a response to the request. The logical clock unit 131, on the other hand, may include logic to determine any appropriate logical clock value related to events in the database server 100 or events related to the database 130. In one embodiment, the logical clock unit 131 includes logic to assign logical time values that indicate the sequence of events, such as database commits, within the database 130. In a related embodiment, this is called a "system count number".

The log writer unit 140 may include at least logic which recognizes when the log writer unit 140 transitions to a particular state and, when the log writer unit 140 transitions to the particular state, writing an LTV to RTV mapping to the volatile mapping data structure 120. The system monitor unit 150 may include logic which recognizes when the system monitor unit 150 transitions to a particular state and, when the system monitor unit 150 transitions to the particular state, writing one or more entries to the non-volatile mapping data structure 160 based on the volatile mapping data structure 120.

The database access unit 135 controls read and write access to the database 130. The database 130 may be any appropriate relational database, object-oriented database, or other structured data. In the example used herein, the database 130 includes the non-volatile mapping data structure 160. The non-volatile mapping data structure 160 stores LTV to RTV mappings and may include either of the example data structures depicted in FIG. 2A or FIG. 2B.

Logical and Real Time Values

Logical and real time values may indicate two important, but different, aspects of a database system. Databases are event-driven, and some databases are built such that the database keeps records of all changes made to it. The sequence number assigned to these events is termed herein as a "logical time value" (an LTV). The events counted in an LTV may include any event that modifies the database, e.g. committed database writes. Other events related to the database may not be counted, e.g. database reads. Any appropriate scheme for determining a logical time value may be used with the techniques described herein, including an LTV implemented as an integer count of the number of events. In one embodiment, each LTV may be associated with multiple events.

A real time value refers to a time value associated with real world time at a particular physical location, usually the physical location of the system in question or the physical location of a user of the system. Each occurrence an event in the database may be associated with an LTV and an RTV. In one embodiment, the LTV and RTV of a database system increase together, with the RTV increasing continuously (with time) and the LTV increasing continually (as events occur in the database). Therefore, as events occur in the database, each subsequent LTV may be mapped to a higher RTV.

Example Data Structures

Any of the volatile mapping data structure 120, the mapping cache 110, and non-volatile mapping data structure 160 discussed herein may take any appropriate form. For example, a volatile mapping data structure 120 may include a first mapping table 200 (described below), a maximum table length, and a "wrap-around" pointer to indicate where the next LTV to RTV mapping entry in the first mapping table 200 should be placed. In a limited-length first mapping table 200, the wrap-around pointer may be beneficial since, if more than the maximum number of entries are written to the volatile mapping data structures 120, then for each new entry added to the volatile mapping data structures 120, the use of the wrap-around pointer will enable the oldest entry in the first mapping table 200 to be overwritten. The same example data structures may also be used for the mapping cache 110. A non-volatile mapping data structure 160 may include any appropriate table including the data structure described for the volatile mapping data structure 120, or the tables 200 or 240 as described in FIG. 2A and FIG. 2B. For example, in the context of FIG. 1, the mapping cache 110 includes a first mapping table 200, the volatile mapping data structure 120 includes a first mapping table 200, and the non-volatile mapping data structure 160 includes a second mapping table 240.

In one embodiment, the volatile mapping data structures 120 is stored in a volatile memory and the non-volatile mapping data structure 160 is stored on disk. Alternatively, both the volatile mapping data structure 120 and the non-volatile mapping data structures 160 may be stored on disk or in memory. In a related embodiment where the volatile mapping data structure 120 and the non-volatile mapping data structures 160 are both stored in memory, the volatile mapping data structures 120 may be stored in a faster memory than the non-volatile mapping data structure 160.

Figure 2A:
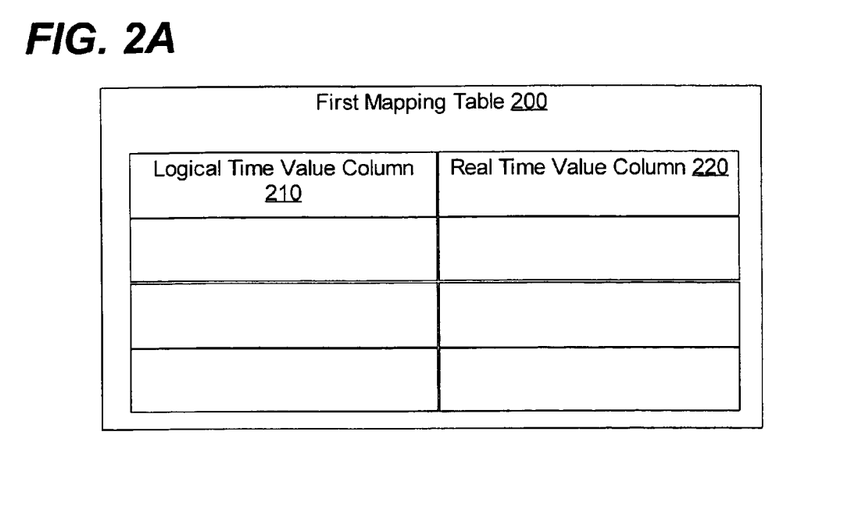
FIG. 2A is an illustration of a first mapping table for storing LTV to RTV mappings.

FIG. 2A is an illustration of a first mapping table 200 for storing LTV to RTV mappings.

The first mapping table 200 comprises two columns: a logical time value column 210 and a real time value column 220. In general, the entries in the first mapping table may include one or more logical time values in the logical time value column and corresponding real time values in the real time value column 220. For example, in the context of FIG. 1, a volatile mapping data structure 120 includes a first mapping table 200, and the first mapping table 200 includes logical time values and corresponding real time values in the logical time value column 210 and the real time value column 220, respectively.

Figure 2B:
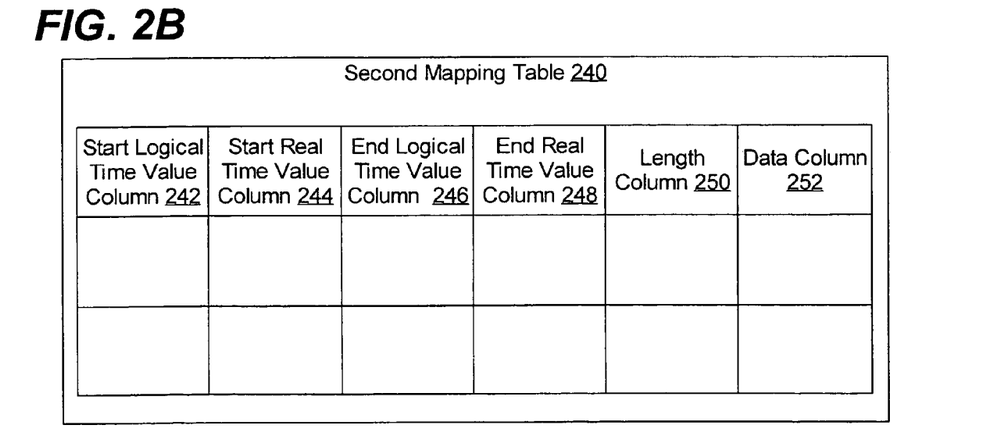
FIG. 2B is an illustration of a second mapping table for storing LTV to RTV mappings.

FIG. 2B is an illustration of a second mapping table 240 for storing LTV to RTV mappings.

The second mapping table 240 includes a starting logical time value column 242, a starting real time value column 244, an ending logical time value column 246, an ending real time value column 248, a length column 250, and a data column 252. Each entry in each of columns 242–252 has a corresponding entry in each of the other column 242–252. The entries in the starting LTV column 242 represent the earliest LTV in the range of LTVs corresponding to the row of the second mapping table 240. The entries in the starting RTV column 244 represent the earliest RTV in range of RTVs corresponding to this row. Similarly, the entries in the ending LTV column 246 and the ending RTV column 248 represent the latest LTV and RTV corresponding to this row, respectively. The entries in the length column 250 indicate the number of entries to be found in the range of entries contained in the corresponding entry in the data column 252. The entry in the data column 252 contains data of any appropriate format that represents a range of LTV to RTV mappings defined by the starting and ending LTVs and RTVs. In one embodiment, the entry in the data column 252 is a memory copy of a two-column, LTV to RTV mapping table. For example, in the context of FIG. 1, the volatile mapping data structure 120 includes a first mapping table 200, and the non-volatile mapping data structure 160 includes a second mapping table 240. Each time a second event occurs, the system monitoring unit 150 writes all entries in the first mapping table 200 that have not previously been written to the second mappings table 240 as a single data block to the data column 252. The system monitoring unit 150 also writes the earliest LTV and RTV and latest LTV and RTV to columns 242, 244, 246, and 248, respectively, and writes the number of rows in the first mapping table 200 to the length column 250.

Functional Overview

Figure 3:
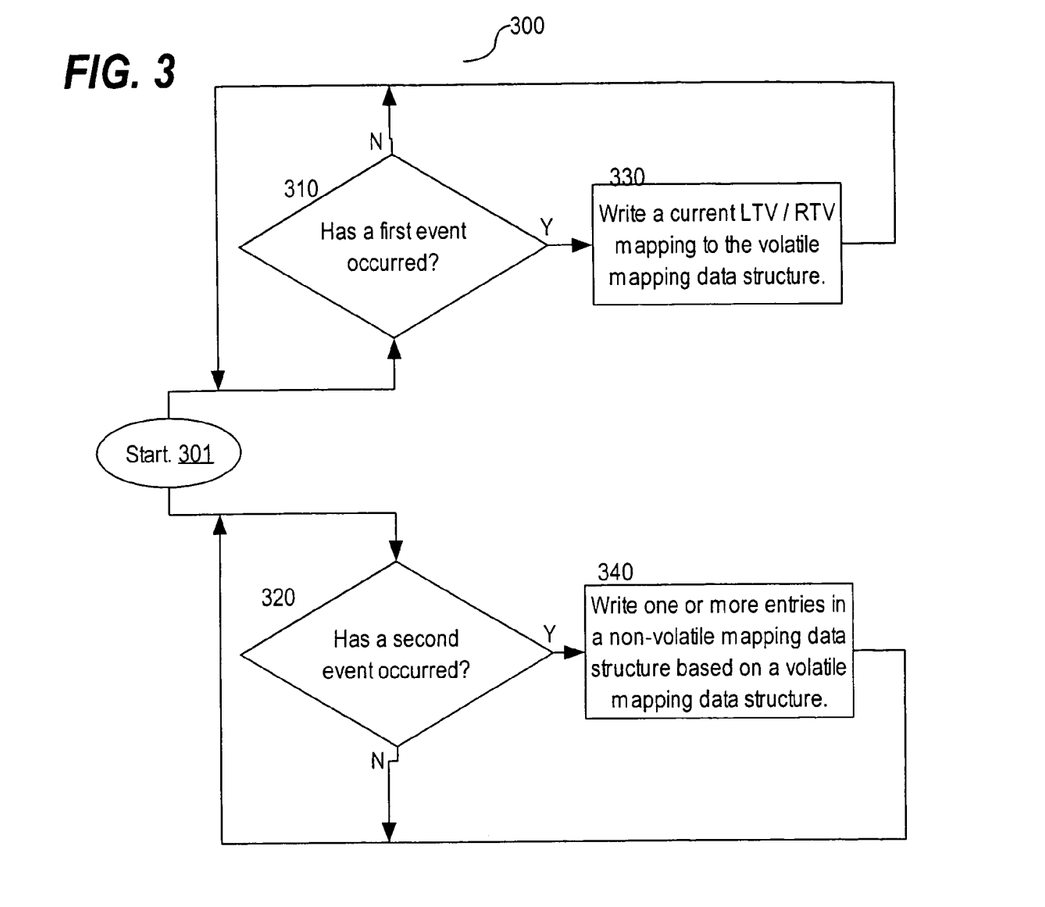
FIG. 3 is a flow diagram depicting a process for updating LTV to RTV mappings.

FIG. 3 is a flow diagram depicting a process for updating LTV to RTV mappings.

In step 301, the process for updating LTV to RTV mappings starts. The process may start by starting one or more processes that determine whether the first event and second event occur. Alternatively, the process may start by executing one or more operating system commands on one or more systems that will cause the first event and second event to occur. For example, in the context of FIG. 1, two clock daemon operating system commands, "cron jobs", are executed on a database server 100, or a process communicatively coupled thereto, in order to cause a log writer unit 140 to execute or "wake up" once every three seconds (corresponding to the occurrence of a "first event") and cause a system monitoring unit 150 to wake up once every five minutes (corresponding to the occurrence of a "second event").

In step 310, a check is performed to determine whether a first event has occurred. The first event may occur when a certain number of records have been written to the database, when a particular period of time passes, or when a certain process transitions to a particular state. For example, in the context of FIG. 1, determining that a first event has occurred may include determining that three seconds (or any particular amount of time) has passed since the most current prior performance of step 330; and the first event may include a cron job causing the execution of code that "wakes up" or initiates a log writer process 140.

If the first event has occurred, then in step 330, a current LTV to RTV mapping is written to a volatile mapping data structure. In order to determine the current LTV and RTV, and thereby a current LTV to RTV mapping, it may be necessary to access a logical clock unit, a real time clock unit, or other mechanism for indicating the appropriate logical and real time values. Once current LTV and RTV are determined, an LTV to RTV mapping is written to the volatile mapping data structure. For example, in the context of FIG. 1 and FIG. 2A, a logical clock unit 131 and a real time clock unit 132 are accessed to determine the current LTV and RTV, respectively. Then the LTV and RTV are written to the LTV column 210 and RTV column 220 of the first mapping table 200, which is part of the volatile mapping data structure 120.

If the first event has not occurred, as determined in step 310, or once the current LTV to RTV mapping has been written to the volatile mapping data structure (step 330), then a check is again performed to determine whether the first event has occurred, step 310. In one embodiment, checks are continually performed to determine whether the first event has occurred as part of step 310.

In step 320 a check is performed to determine whether a second event has occurred. The second event may occur when a certain number of records have been written to the database, when a particular period of time passes since the most current prior performance of step 340, when the volatile mapping data structure has a particular number of entries, or when a certain process transitions to a particular state. For example, in the context of FIG. 1, determining that a second event has occurred may include determining that five minutes (or any particular amount of time) has passed since the last occurrence of the second event; and the second event may be caused by a cron job causing the execution of a system monitoring process 150.

If the second event has occurred, then in step 340, one or more entries are written to a non-volatile mapping data structure based on the contents of the volatile mapping data structure. In one embodiment, after writing the one or more entries to the non-volatile mapping data structure based on the volatile mapping data structure, the volatile mapping data structure is emptied or otherwise reset. In one embodiment, one entry is added to the non-volatile mapping data structure for each entry in the volatile mapping data structure. Alternatively, a single entry is added to the non-volatile mapping data structure based on the entire contents of the volatile mapping data structure. For example, in the context of FIG. 1 and FIG. 2B, the second event has occurred, which has caused the execution of the system monitoring process 150. The system monitoring unit 150 reads the contents of the volatile mapping data structure 120 and determines the earliest and latest RTVs and LTVs as well as the number of entries in the volatile mapping data structure 120. The system monitoring unit 150 then writes the earliest LTV, earliest RTV, latest LTV, latest RTV, and number of entries to columns 242, 244, 246, 248, and 250 of the second mapping table 240 which is part of the non-volatile mapping data structure 160. The system monitoring process also writes the entire contents of the first mapping table 200, which is part of the volatile mapping data structure 120, in binary form to an entry in the data column 252 corresponding to the entries previously written in columns 242–250.

If the second event has not occurred, as determined in step 320, or once the current LTV to RTV mapping has been written to the second mapping table (step 340), then a check is again performed to determine whether the second event has occurred, step 320. In one embodiment, checks are continually performed, as part of step 320, to determine whether the second event has occurred.

Various embodiments of FIG. 3 provide continual updating of the volatile and non-volatile mapping data structures based on appropriate system events. Depending on implementation and desired results, it may be beneficial to use an embodiment in which the first event occurs more often than the second event and to provide the volatile mapping data structure in a faster memory, e.g. in volatile memory, and to provide the non-volatile mapping data structure in a relatively slower memory, e.g. in a non-volatile memory. One benefit derived from such an embodiment is a reduction in the burden on the system of recording the LTV to RTV mappings.

Different choices of events for the first event and second event each have potential benefits. One potential benefit of an embodiment in which the first event occurs each time a change is made to the database is that each LTV will have an LTV to RTV mapping recorded in the volatile mapping data structure. On the other hand, a potential benefit of having the first event occur with a particular frequency is that it enables a fixed temporal granularity of LTV to RTV mappings. One potential benefit of having each of the first or second events occur when a particular processes transition to particular states may be ease of implementation and the transitions may happen at a particular frequency or when a change is made to the database, thereby incorporating other event types. A potential benefit of having the second event occur each time a particular number of entries have been added to the volatile mapping data structure since the last occurrence of the second event may be ensuring that the second event occurs as infrequently as possible while still ensuring that the second mapping includes all of the mappings that had been recorded to the volatile mapping data structure; this may be especially important when there is a fixed maximum number of entries allowable in the volatile mapping data structure. It may be beneficial to set the maximum number of entries in the volatile mapping data structure to ensure that the second event will occur (and the entries of the volatile mapping data structure written to the non-volatile mapping data structure) before the volatile mapping data structure is reaches the maximum number of entries. For example, in the context of FIG. 1, if a second event occurs once every three hundred seconds and the first event occurs once every three seconds, then having the maximum number of entries for the volatile mapping data structure 120 set to a number greater than one hundred would ensure that the volatile mapping data structure 120 will not reach its maximum capacity before the occurrence of the second event, and, thereby, and depending on implementation, all of the entries in the volatile mapping data structure 120 may be written to the non-volatile mapping data structure 160.

Figure 4:
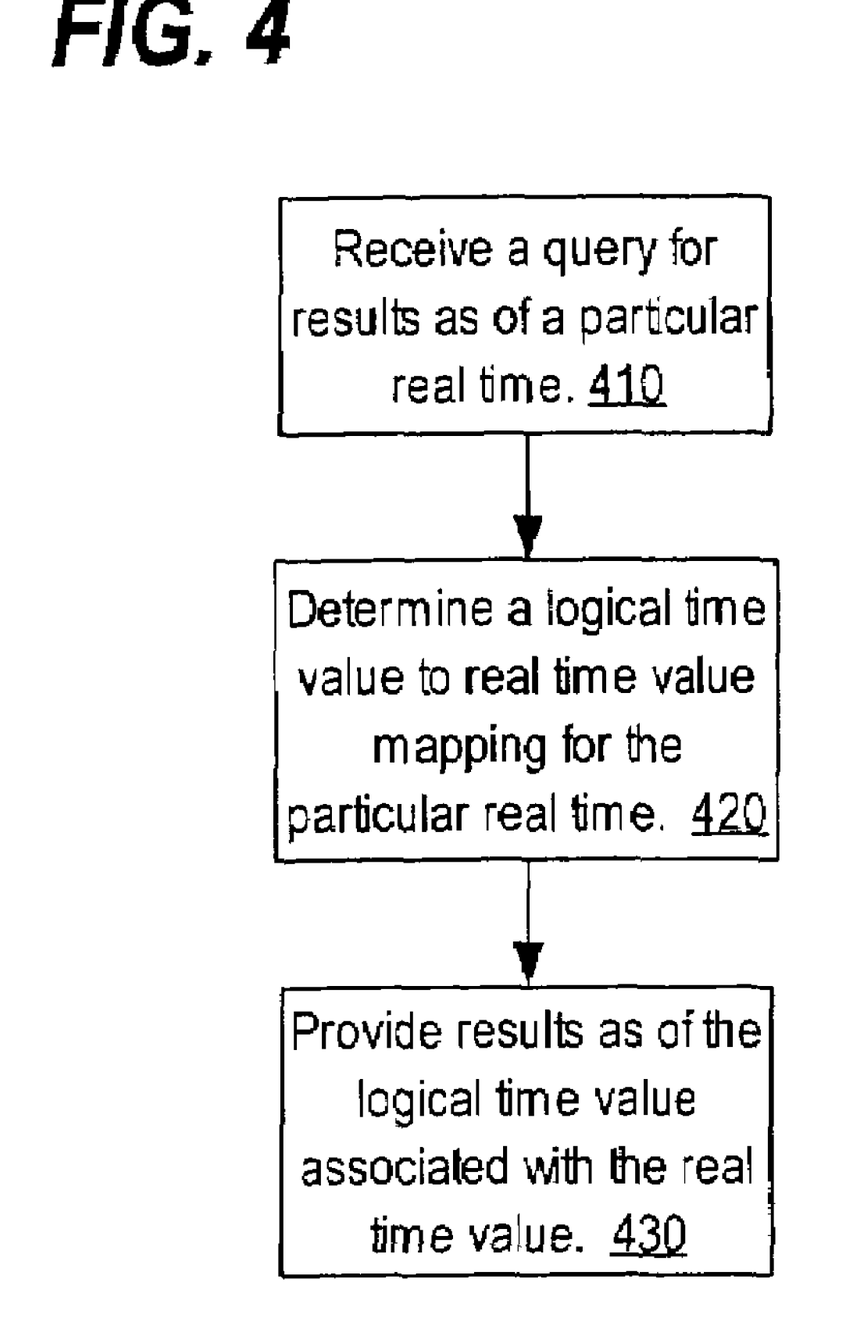
FIG. 4 is a flow diagram depicting a process for responding to a query as of a particular real time.

FIG. 4 is a flow diagram depicting a process for responding to a query as of a particular real time.

In step 410, a query is received that request results as of a particular real time. The query may be received by a database server or a process communicatively coupled thereto. The query may be received from an outside process, may be typed into a command line interface, or may be received via any appropriate mechanism. For example, in the context of FIG. 1, a database server 100 received a query for results as of a particular real time is from an outside process via a user proxy unit 105. The query may be in any query language supported by or interpretable by the receiving database server, including Structured Query Language (SQL).

In step 420, an LTV to RTV mapping is determined for the particular real time. Various embodiments of determining an LTV to RTV are discussed below with respect to FIG. 5 and in other sections herein. For example, in the context of FIG. 1, a user proxy unit 105 determines an LTV to RTV mapping for the particular real time using the process described with respect to FIG. 5.

In step 430, results are provided as of the LTV indicated by the LTV to RTV mapping determined in step 420. Providing results as of a particular time may include effectively backing out all changes made to the database since the LTV indicated by the LTV to RTV mapping while executing the "as of" query. Various embodiments of providing results as of a particular time are described in '211.

Various embodiments described in FIG. 4 provide a mechanism for providing results as of a particular real time.

Figure 5:
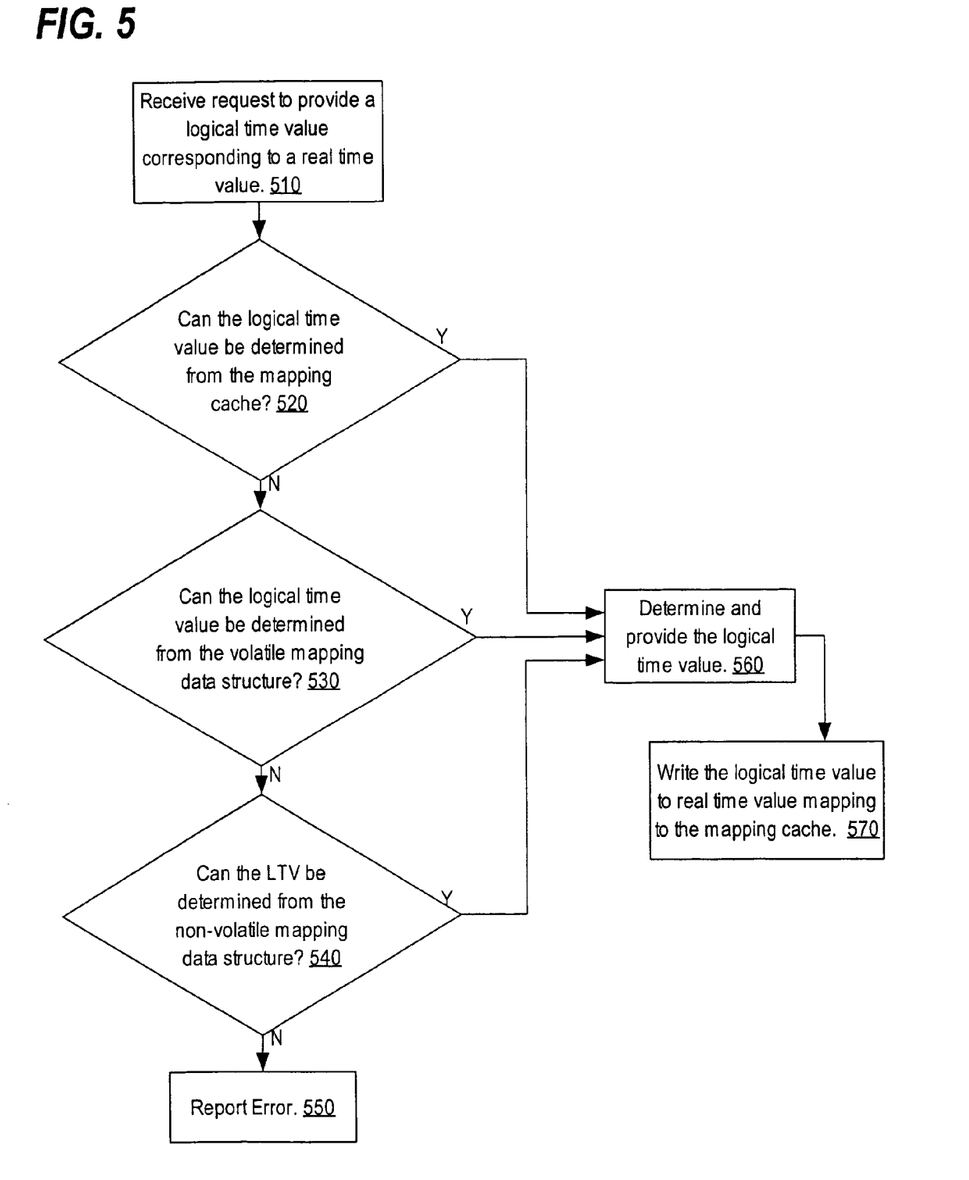
FIG. 5 is a flow diagram depicting a process for providing mappings between logical time values and real time values.

FIG. 5 is a flow diagram depicting a process for providing mappings between logical time values and real time values.

In step 510 a request to provide an LTV corresponding to an RTV is received. The request may be received from any appropriate party, including an outside process or a process within a database server. Any appropriate unit or process may receive the request. For example, in the context of FIG. 1, a database server 100 receives a query from a database application requesting results "as of" a particular RTV. The database server 100 then requests an LTV to RTV mapping from the user proxy unit 105.

In one embodiment, in step 520, a check is performed to establish whether the LTV can be determined from the mapping cache. In other embodiments, no mapping cache is included, no check of a mapping cache is performed, step 520 is not performed, and step 530 is performed after step 510. The check of the mapping cache, if performed, may include determining whether an RTV included in the cache is "close enough" to the RTV in question. An RTV in the mapping cache, or even in the volatile mapping data structure and non-volatile mapping data structure, may be considered "close enough" if it is within a predefined period of time of an RTV in the cache or data structure. In other embodiments, the RTV will be considered close enough if it is within a predetermined period of time after an RTV in the cache or data structure. For example, in the context of FIG. 1, an RTV is considered close enough to an RTV in the mapping cache 110 if it is within the three seconds after the RTV in the mapping cache 110.

If an LTV corresponding to the particular RTV cannot be determined from the mapping cache in step 520, then in step 530, a check is performed to establish whether an LTV can be determined from the volatile mapping data structure. Establishing whether an LTV can be determined from the volatile mapping data structure may include determining whether the particular RTV is close enough to an RTV in the first mapping table, determining whether the RTV is within the range of RTVs included in the table, or any other appropriate check. For example, in the context of FIG. 1, a user proxy unit 105 performs a check to establish whether an LTV can be determined for an RTV by first checking the maximum allowable age of an RTV in the volatile mapping data structure 120, which in this example is five minutes. If the RTV is more than five minutes old, the RTV could not be defined by information in the volatile mapping data structure 120. If the RTV is less than five minutes old, then the range of RTVs values known to be in the volatile mapping data structure 120 is checked. If the particular RTV is within the range of RTVs values in the range of RTVs values in the volatile mapping data structure 120, then an RTV to LTV mapping is determined from the volatile mapping data structure 120.

If an LTV corresponding to the particular RTV cannot be determined from the volatile mapping data structure in step 530, then in step 540, a check is performed to establish whether an LTV can be determined from the non-volatile mapping data structure. Establishing whether an LTV can be determined from the non-volatile mapping data structure may include determining whether the particular RTV is close enough to an RTV in the non-volatile mapping data structure, determining whether the RTV is within the range of RTVs included in the non-volatile mapping data structure, or any other appropriate check. For example, in the context of FIG. 1, a user proxy unit 105 performs a check to establish whether an LTV can be determined for an RTV by first checking the maximum allowable age, as defined by the user configuration 106, of an RTV in the non-volatile mapping data structure, which in this example is three months. If the RTV is older than the maximum allowable age for an RTV in the non-volatile mapping data structure 160, then an error is reported in step 550. If the RTV is within the allowable ages for the non-volatile mapping data structure 160, then a check is performed to establish whether the particular RTV is within the range of RTVs known to be in the non-volatile mapping data structure 160. If the RTV is within the range of RTVs known to be within the non-volatile mapping data structure, then step 560 is performed. Otherwise an error is reported in step 550.

If an LTV for the particular RTV can be determined from the mapping cache (step 520), the first mapping table (step 530), or the second mapping table (step 540), then in step 560, the LTV is determined and the logical time value is provided to the requestor. The method of determining the LTV for the RTV will vary depending on the type of data structure employed by whichever of the mapping cache, volatile mapping data structure, or non-volatile mapping data structure has been established as being able to provide the LTV. If the type of data structure is a table of LTV to RTV mappings, then determining the LTV may include determining 1) whether the particular RTV is close enough to an entry in the data structure or cache, or 2) which entry in the data structure or cache best approximates the particular RTV. The concept of an RTV entry being close enough to the particular RTV is described above. Determining which entry in the table best approximates the particular RTV may include establishing as the mapping RTV either the RTV in the table is the closest in absolute time to the particular RTV or the RTV in the table is the closest in time among the RTVs that occurred before (or in another embodiment, after) the particular RTV. Once the mapping RTV has been established, then the LTV corresponding to the RTV is established as the mapped LTV. The mapped LTV is sent to the requestor and the mapping RTV/mapped LTV mapping is written to the mapping cache in step 570.

If the LTV for the particular RTV can not be determined from the mapping cache, volatile mapping data structure, or non-volatile mapping data structure, then an error is reported in step 550. Reporting an error may involve any appropriate action, including sending a reply to the requestor indicating the failure, writing a record of the failure to a log file or database, or sending a message to an administrator of the database server 100.

Various embodiments of FIG. 5 enable the efficient determination of LTV to RTV mappings. The use of multiple tables and caches enables the efficient storage (as described with respect to FIG. 3) and efficient retrieval (as described with respect to FIG. 5) of LTV to RTV mappings. The query processing of FIG. 4 further enables the use of the LTV to RTV mappings to enable queries to be executed "as of" a particular real time.

Hardware Overview

Figure 6:
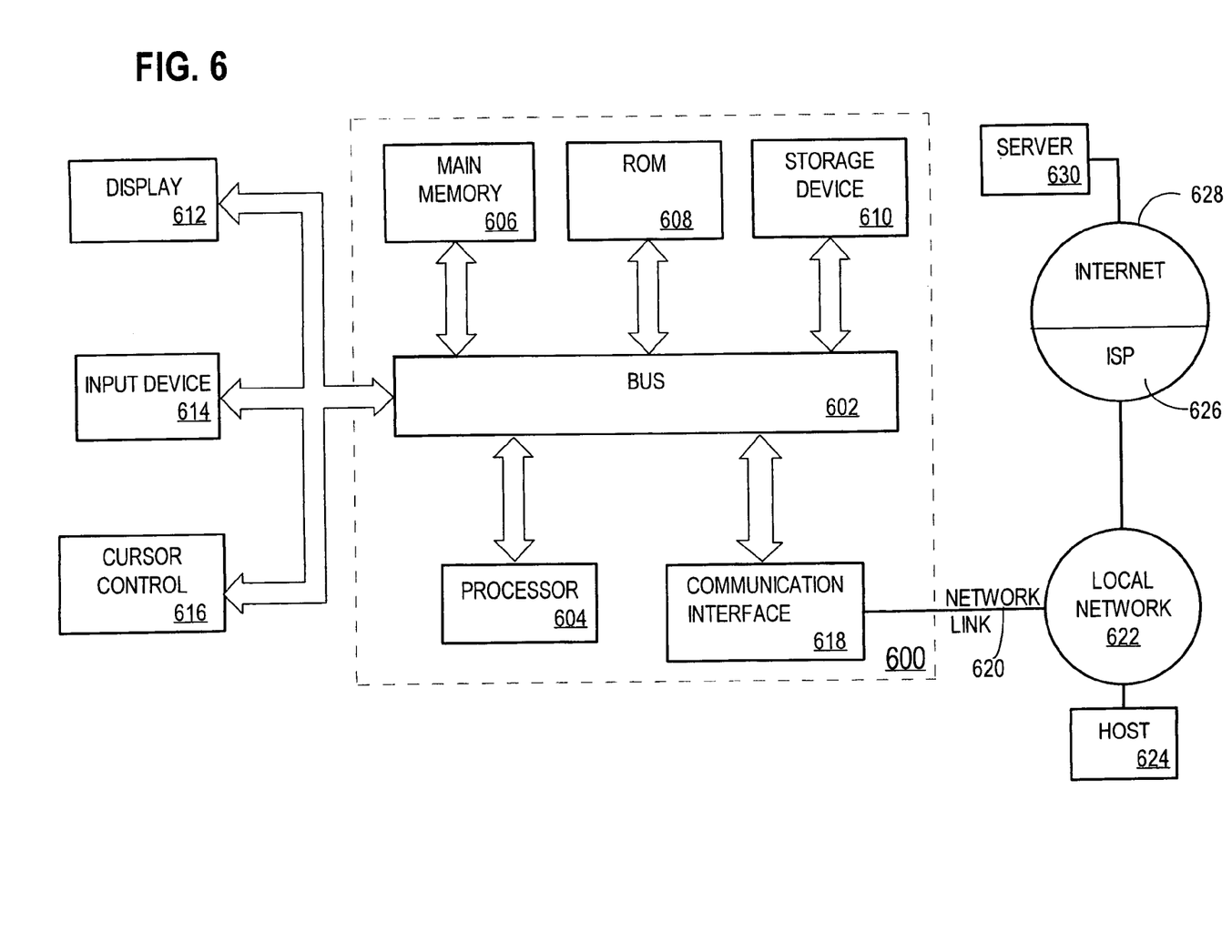
FIG. 6 is a block diagram that illustrates a computer system upon which an embodiment of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of providing mappings between logical time values and real time values for a database comprising the machine-implemented steps of:

in response to determining that a first event related to the database occurs, writing an entry of a current LTV and a current RTV in a first mapping data structure;

in response to determining that a second event related to the database occurs, writing one or more entries in a second mapping data structure based on information contained in the first mapping data structure;

receiving a request from a requestor to provide an LTV that is mapped to a particular RTV;

determining the LTV for the particular RTV, based on the particular RTV and information from a source, wherein the source is one of the first mapping data structure and the second mapping data structure; and providing the LTV that is mapped to the particular RTV to the requestor.

2. The method of claim 1, wherein the step of determining the LTV comprises:

performing a first check to determine whether the LTV that is mapped to the particular RTV can be determined from the first mapping data structure;

if the LTV that is mapped to the particular RTV can be determined from the information in first mapping data structure, then determining the LTV that is mapped to the particular RTV; and providing the LTV that is mapped to the particular RTV to the requestor;

if the LTV that is mapped to the particular RTV cannot be determined from the first mapping data structure, then performing a second check to determine whether the LTV that is mapped to the particular RTV can be determined from information in the second mapping data structure;

if the LTV that is mapped to the particular RTV can be determined from the information in second mapping data structure, then:

determining the LTV that is mapped to the particular RTV; and providing the LTV that is mapped to the particular RTV to the requestor.

3. The method of claim 2, further comprising the steps of:

prior to performing the first check and the second check, performing a cache check to determine whether the LTV that is mapped to the particular RTV can be determined from a cache; and wherein the first check is performed in response to determining that the LTV that is mapped to the particular RTV can not be determined from the cache.

4. The method of claim 3, further comprising the step of, if the LTV can be determined from the first mapping data structure or from the second mapping data structure, then populating the cache by writing the LTV that is mapped to the particular RTV to the cache of LTV to RTV mappings, wherein LTV that is mapped to the particular RTV is determined based on information in the first mapping data structure or information in the second mapping data structure.

5. The method of claim 1, wherein the first mapping data structure is stored in a relatively faster machine-readable medium and the second mapping data structure is stored in a relatively slower machine-readable medium.

6. The method of claim 5, wherein the relatively faster machine-readable medium is a volatile memory and the relatively slower machine-readable medium is a non-volatile memory.

7. The method of claim 1, wherein a maximum age of RTV in the second mapping data structure is defined by a user-specified configuration value.

8. The method of claim 1, wherein the first event is a first recurring event and the second event is a second recurring event, and the first recurring event occurs more often than the second recurring event.

9. The method of claim 8, wherein the first recurring event occurs when a log writer process transitions to a certain state.

10. The method of claim 8, wherein the second recurring event occurs when a system monitor process transitions to a certain state.

11. The method of claim 1, wherein the first event occurs when a record is written to the database.

12. The method of claim 1, further comprising the step of maintaining the first mapping data structure such that the first mapping data structure contains the LTV to RTV mappings for the most recent RTV values.

13. The method of claim 1, wherein the method further comprises the machine implemented steps of:

receiving a query requesting information as of the particular RTV;

providing, as results of the query, only information that is associated with commit LTVs that are not more recent than the LTV that is mapped to the particular RTV.

14. The method of claim 2, wherein the step of performing the first check to determine whether the LTV that is mapped to the particular RTV can be determined from the first mapping data structure comprises:

determining a range of RTV values in the first mapping data structure; and determining whether the particular RTV falls in the range of RTV values.

15. The method of claim 2, wherein the step of performing the second check to determine whether the LTV that is mapped to the particular RTV can be determined from the second mapping data structure comprises:

Determining a range of RTV values in the second mapping data structure; and determining whether the particular RTV falls in the range of RTV values.

16. The method of claim 2, wherein the second mapping data structure comprises one or more columns that indicate ranges of RTV values and a particular column containing information related to the LTV to RTV mappings for the ranges of RTV values; and the step of performing the second check to determine whether the LTV that is mapped to the particular RTV can be determined from the second mapping data structure comprises performing a particular check to determine whether the particular RTV falls within any of the ranges of RTV values.

17. The method of claim 1, further comprising the step of, if the LTV that is mapped to the particular RTV cannot be determined from the first mapping data structure and the LTV that is mapped to the particular RTV cannot be determined from the second mapping data structure, then reporting an error.

18. The method of claim 17, wherein reporting the error comprises sending a message to one or more of a database administrator, a system administrator, and a sender of the request.

19. The method of claim 1, wherein the second event occurs when there are a predefined number of new entries in the first mapping data structure since a previous occurrence of the second event.

20. The method of claim 1, wherein the step of writing one or more entries in the second mapping data structure comprises writing a single entry that contains information corresponding to all entries in the first mapping data structure.

21. A method of providing mappings between logical time values and real time values for a database comprising the machine-implemented steps of:
   in response to determining that a first event related to the database occurs, writing an entry of a current LTV and a current RTV in a first mapping data structure;
   in response to determining that a second event related to the database occurs, writing one or more entries in a second mapping data structure based on information contained in the first mapping data structure;
   receiving a request from a requestor to provide an RTV that is mapped to a particular LTV;
   performing a first check to determine whether the RTV that is mapped to the particular LTV can be determined from the first mapping data structure;
   if the RTV that is mapped to the particular RTV can be determined from the information in first mapping data structure, then
      determining the RTV that is mapped to the particular LTV; and
      providing the RTV that is mapped to the particular LTV to the requestor;
   if the RTV that is mapped to the particular LTV cannot be determined from the first mapping data structure, then performing a second check to determine whether the RTV that is mapped to the particular LTV can be determined from information in the second mapping data structure;
   if the RTV that is mapped to the particular LTV can be determined from the information in second mapping data structure, then:
      determining the RTV that is mapped to the particular LTV; and
      providing the RTV that is mapped to the particular LTV to the requestor.

22. A computer-readable storage medium carrying one or more sequences of instructions which, when executed by one or more processors, causes the one or more processors to perform the method recited in claim 1.

23. A computer-readable storage medium carrying one or more sequences of instructions which, when executed by one or more processors, causes the one or more processors to perform the method recited in claim 2.

24. A computer-readable storage medium carrying one or more sequences of instructions which, when executed by one or more processors, causes the one or more processors to perform the method recited in claim 3.

25. A computer-readable storage medium carrying one or more sequences of instructions which, when executed by one or more processors, causes the one or more processors to perform the method recited in claim 4.

26. A computer-readable storage medium carrying one or more sequences of instructions which, when executed by one or more processors, causes the one or more processors to perform the method recited in claim 5.

27. A computer-readable storage medium carrying one or more sequences of instructions which, when executed by one or more processors, causes the one or more processors to perform the method recited in claim 6.

28. A computer-readable storage medium carrying one or more sequences of instructions which, when executed by one or more processors, causes the one or more processors to perform the method recited in claim 7.

29. A computer-readable storage medium carrying one or more sequences of instructions which, when executed by one or more processors, causes the one or more processors to perform the method recited in claim 8.

30. A computer-readable storage medium carrying one or more sequences of instructions which, when executed by one or more processors, causes the one or more processors to perform the method recited in claim 9.

31. A computer-readable storage medium carrying one or more sequences of instructions which, when executed by one or more processors, causes the one or more processors to perform the method recited in claim 10.

32. A computer-readable storage medium carrying one or more sequences of instructions which, when executed by one or more processors, causes the one or more processors to perform the method recited in claim 11.

33. A computer-readable storage medium carrying one or more sequences of instructions which, when executed by one or more processors, causes the one or more processors to perform the method recited in claim 12.

34. A computer-readable storage medium carrying one or more sequences of instructions which, when executed by one or more processors, causes the one or more processors to perform the method recited in claim 13.

35. A computer-readable storage medium carrying one or more sequences of instructions which, when executed by one or more processors, causes the one or more processors to perform the method recited in claim 14.

36. A computer-readable storage medium carrying one or more sequences of instructions which, when executed by one or more processors, causes the one or more processors to perform the method recited in claim 15.

37. A computer-readable storage medium carrying one or more sequences of instructions which, when executed by one or more processors, causes the one or more processors to perform the method recited in claim 16.

38. A computer-readable storage medium carrying one or more sequences of instructions which, when executed by one or more processors, causes the one or more processors to perform the method recited in claim 17.

39. A computer-readable storage medium carrying one or more sequences of instructions which, when executed by one or more processors, causes the one or more processors to perform the method recited in claim 18.

40. A computer-readable storage medium carrying one or more sequences of instructions which, when executed by one or more processors, causes the one or more processors to perform the method recited in claim 19.

41. A computer-readable storage medium carrying one or more sequences of instructions which, when executed by one or more processors, causes the one or more processors to perform the method recited in claim 20.

42. A computer-readable storage medium carrying one or more sequences of instructions which, when executed by one or more processors, causes the one or more processors to perform the method recited in claim 21.

* * * * *